Figure 1:
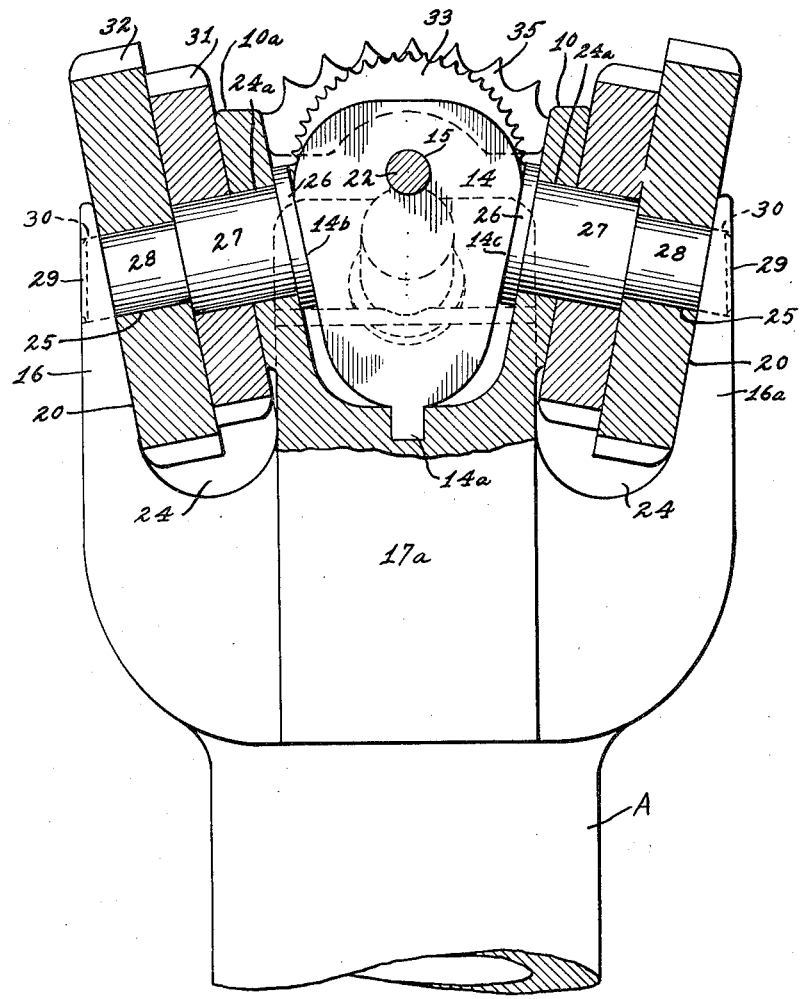

Aug. 27, 1935. A. W. JOHNS ET AL 2,012,312
TOOL
Filed Aug. 10, 1931 4 Sheets-Sheet 1

INVENTORS
Arthur W. Johns
Charles O. Thrasher
Stuart R. Earl
John Peck

Aug. 27, 1935.  A. W. JOHNS ET AL  2,012,312
TOOL.
Filed Aug. 10, 1931  4 Sheets-Sheet 2

INVENTORS
Arthur W. Johns
Charles A. Thrasher
Stuart R. Earl
John Pedrack

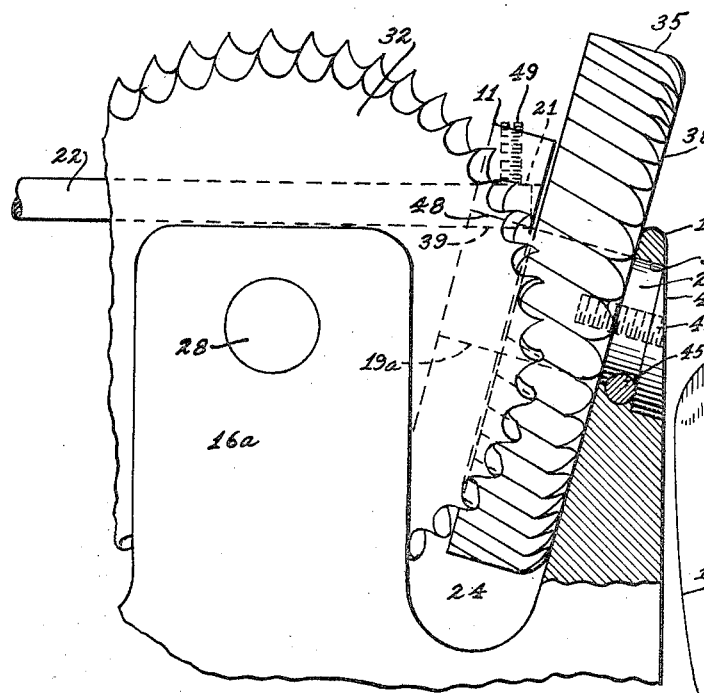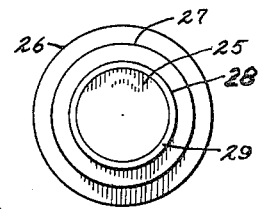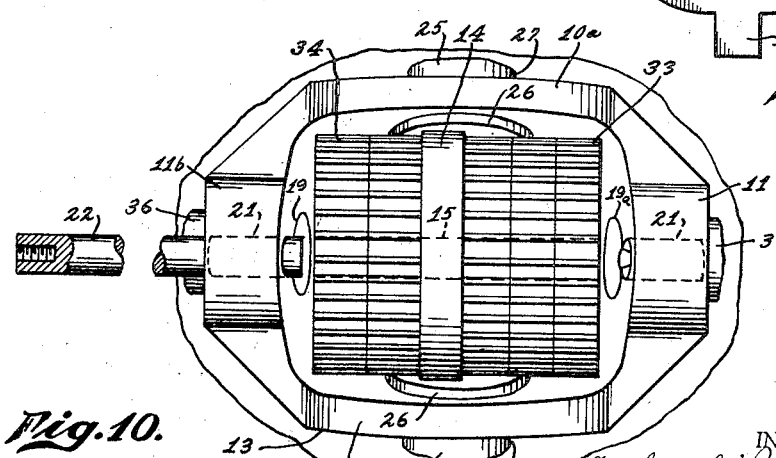

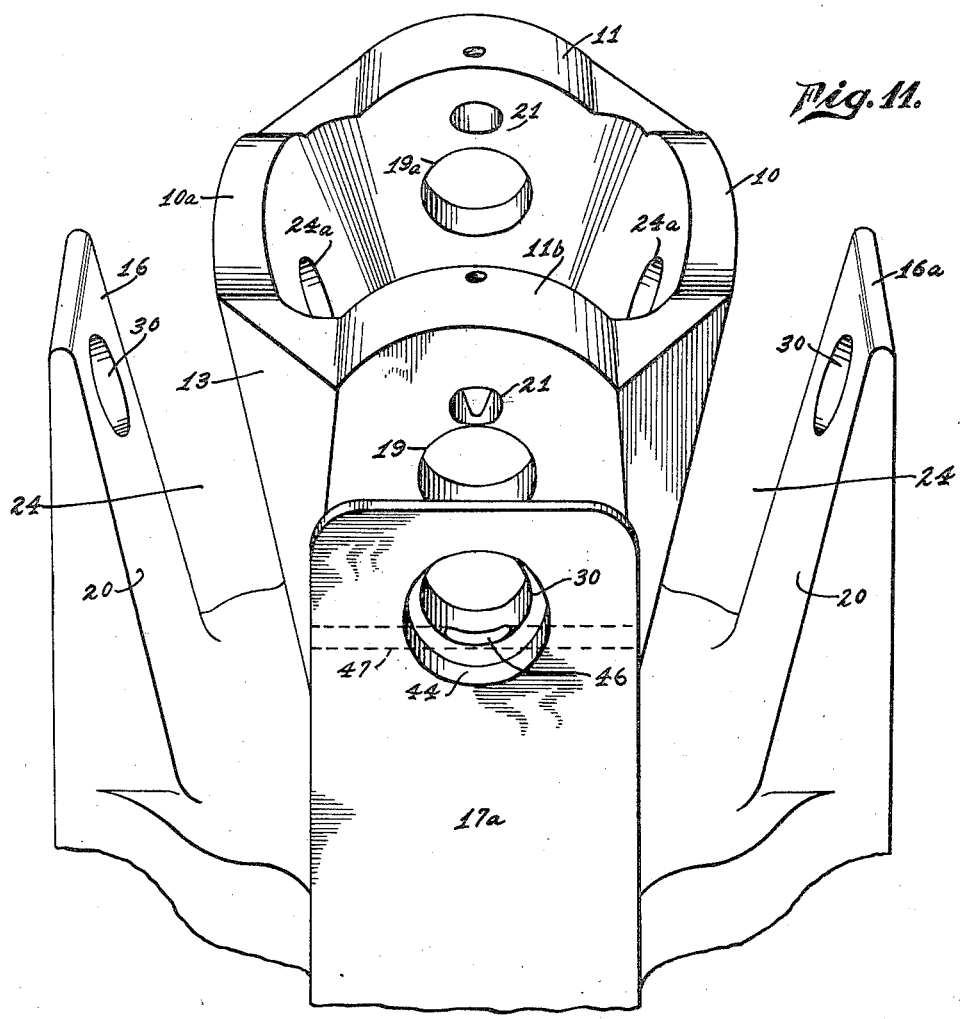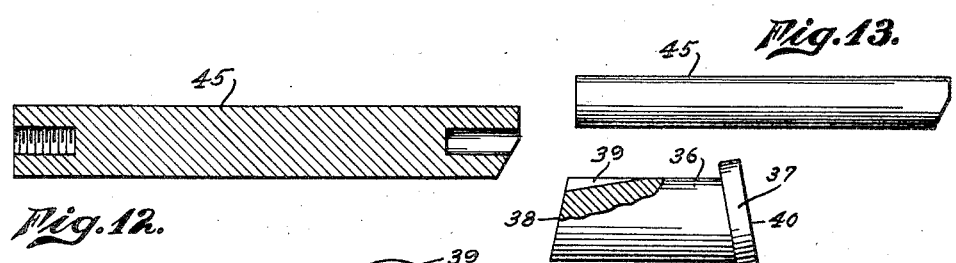

Patented Aug. 27, 1935

2,012,312

UNITED STATES PATENT OFFICE 2,012,312

TOOL

Arthur W. Johns, Los Angeles, Charles O. Thrasher and Stuart R. Earl, Southgate, and John Pechacek, Norwalk, Calif.

Application August 10, 1931, Serial No. 556,170

5 Claims. (Cl. 255—71)

This invention relates to improvements in oil well equipment used in oil drilling and more particularly to rotary drill bits.

One of the objects of this invention is to provide a simple, efficient and inexpensive oil well drilling tool in the nature of a drill bit which shall consist of a minimum number of parts properly arranged and designed for the purpose of facilitating the accurate drilling of wells.

Another important object of this invention is to provide a tool wherein a shank is made use of which carries at one end a casing or housing for rotary cutters, certain cutters being arranged substantially in the center of housing and other cutters substantially 90 degrees apart and around the first named cutters.

A further object of the present invention is to provide convenient means of journaling the sets of rotary cutters in such a manner that a locking plate engaging one journal assists in locking the other journals in position.

Another important object hereof is to provide means for journaling separate sets of cutters in a tool shank in such a manner that the sets of cutters have their separate journals interlocked by common bearing means, all journals being held against displacement until a locking plate is removed therefrom. A still further object of this invention is to devise improved means for locking sets of rotary cutters in a tool shank whereby they may be quickly removed or disassembled from the tool at will without unnecessary loss of time.

Another object thereof is to provide upon a tool shank a dished out portion in which sets of cutters are placed, journal pins being employed to lock these cutters in the dished-out portion, there being a bearing block centered in this dished-out portion designed primarily to confine in position journal pins employed for the purpose of mounting outside sets of cutters.

The main purpose of this invention is to provide a tool which is equipped with center and peripheral cutters and with bearings for the journal pins of the several sets of cutters.

With the above and other objects in view our invention consists in the arrangement, combination and details of construction disclosed in the drawings and specification and then more particularly pointed out in the appended claims.

Figure 2:
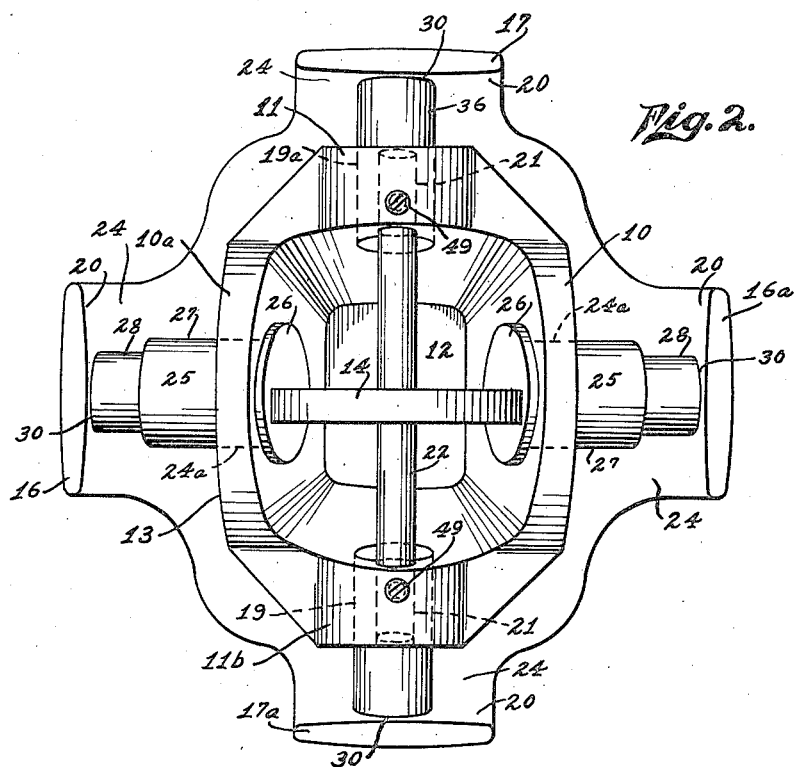
Figures 3, 4, 5:
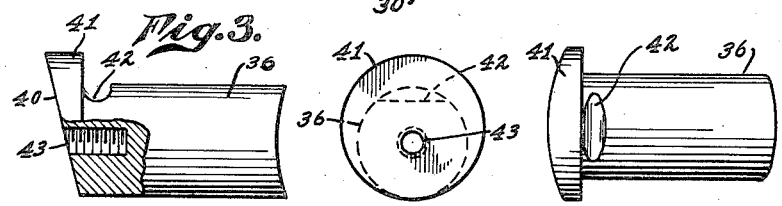
Figure 6:
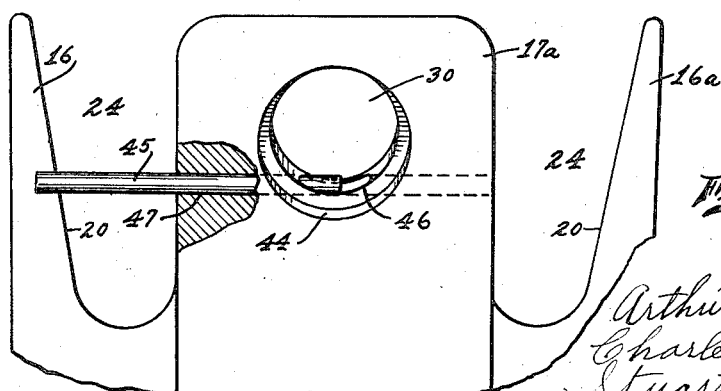

In the drawings, which are merely illustrative of our invention and in which similar reference characters designate similar parts throughout the respective views, Figure 1 is a fragmental elevation, partly in section, of the tool, Figure 2 is a top plan view of the tool with the rotary cutters removed, Figure 3 is a side view, partly in section, of a journal pin, Figure 4 is a rear end view of a journal pin, Figure 5 is a top plan view of a journal pin, Figure 6 is a fragmental detail view of the cutter head showing the locking pin for the journal pin shown in Figure 3, Figure 7 is a fragmental detail view of the bit showing the journal pin in position, Figure 8 is an end view of the journal pin, Figure 9 is a side elevation of the locking plate, Figure 10 is a top plan view, partly in section, of the housing, showing a shaft for the rotary cutters thereof, Figure 11 is a perspective view of the housing with adjacent parts, partly in section, Figure 12 is a longitudinal sectional view of the locking pin associated with the journal pin, Figure 13 is a side view of the locking pin, Figure 14 is a side view, partly in section, of a journal pin, and Figure 15 is a cross-sectional view taken thru the journal pin, shown in Figure 14.

In the drawings, the type of tool shank shown carries at its working end a series of angularly arranged rotary cutters used for boring or drilling operations. It has always been a serious problem how to mount the various sets of cutters in a manner to admit of their instant removal for the purpose of replacement or repairs, and at the same time to keep them compactly together on the tool. In such tools it is desirable to journal the cutters in a manner to conceal their journal pins, the projecting parts of the bearings therefor, and to use up all available space for seating the cutters.

The tool shank A, is formed at its outer working end with an integral housing substantially rectangular in shape having opposing walls 10, 10a, and walls 11, 11b, which are also oppositely arranged. This housing may be of a rounded contour, if desired, and the walls of this housing may flare upwardly a slight amount. The outer face of the housing is designated 13. In this housing is an upright bearing block 14 having a lower central peg 14a, removably seated or anchored in the bottom 12 of the housing. The block 14 is formed with a central shaft opening 15, and has oppositely inclined downwardly converging edges 14b, 14c respectively.

The tool shank A is also formed integrally with a plurality of circumferentially spaced arms, one arm being opposite each side wall of the housing. Thus it will be seen that two arms, 17, 17a are spaced opposite to the housing walls 11b, 11, while two arms 16, 16a are spaced opposite to the housing walls 10a, 10 respectively. It will also be seen that the inner faces 20 of the sets of arms incline upwardly so as to be disposed parallel to the adjacent outer walls of the housing; this produces spaces 24 between the several arms and the housing walls thereadjacent. It will also be seen that arms 16, 16a are spaced a greater distance from the housing walls 10a, 10 than arms 17a, 17 are from housing walls 11, 11b.

A pair of aligning holes 21, 21 are formed respectively upon the walls 11b, 11 of the housing of the tool shank, while below these holes are another set of holes which are out of alignment with each other, so that the hole 19 in the wall 11b is on one side of the center of hole 21, while the hole 19a in wall 11 is on the other side of the center of hole 21.

In applying the journal shafts or pins in the housing and bearing member for the purpose of mounting the cutters therein, the procedure will be as follows. A shaft 22 has its ends passing into, so as to be journaled in the holes 21 of the housing, so as to pass through the hole 15 of the upper end of the bearing block 14. But before this is done the journal pins about to be described will be applied respectively so as to span each space 24 of the tool.

Two journal pins 25 are provided (Fig. 8) being of similar construction, each having a flange or head 26 at one end, a stub 27 and a shank 28. The shank 28 of each journal pin 25 is beveled as at 29. Before the bearing block 14 is placed in position in the housing one journal pin 25 is taken and is introduced angularly so as to incline downwardly and pass thru either hole 24a of the housing walls 10, 10a so that its flange 26 bears against the inclined face of the wall 10, or 10a respectively, and so that its stub 27 projects thru hole 24a, after which this journal pin 25 will span the space 24 and its shank 28 will pass thru the opening or hole 30 formed in the bearing arms 16a, 16 of the housing made to receive the same. It will now be seen that the beveled ends 29 of these journal pins are disposed flush with the outer face of the bearing arms 16a, 16. It will be understood that before the shank 28 of each journal pin is inserted into a hole 30, the rotary cutters 31, and 32 will have been mounted thereupon, so as to extend into the space 24. The other journal pin is introduced in a similar way, so as to project with its stub 27 thru hole 24a of the housing wall 10a, and with its shank 28, after receiving thereupon the rotary cutters 31, 32, into hole 30 of the arm 16.

After both journal pins 25 have been properly mounted in position as hereinbefore described, the bearing block 14 will be wedged home against the flanges 26 of both journal pins, engaging with its oppositely inclined edges against these pin flanges. This having been done the elongated shaft 22 is next inserted thru one hole 21 in the housing 11b, and thru the centering holes of a series of laterally contacting rotary cutters arranged in two sets 33 and 34. One set of these cutters consists of three of them designated 33, which are journaled upon the shaft 22 on one side of the journal bearing block 14, and which project into the housing, and a second set of preferably two cutters 34 are journaled upon this shaft 22 and also project rotatably in the housing. The other end of this shaft 22 passes ultimately into a hole 21 in the housing wall 11. However, before this takes place the remaining rotary cutters will be placed in the housing and bearing member. This is accomplished as follows.

Each rotary cutter 35 is first introduced in one of the spaces 24 disposed between housing wall 11, bearing wall 17, on the one hand, and housing wall 11b, and bearing wall 17a, on the other hand. We provide a pair of journal pins for these single rotary cutters 35. Since the cutters 33 and 34 already extend into the interior space of the housing, the journal pins can no longer be inserted from inside of the housing to the outside thereof. So now it is necessary to insert these journal pins from outside of the bearing arms.

Accordingly we take the journal pins shown in Figure 14, and as shown in Figure 2 we insert one of them so that its shank 36 spans the space 24 and so that its flange 37 is either countersunk into or may overlap, the bearing arm 17 so the outer face of this pin, designated 40 is disposed flush with the outer face of this arm 17. The shank 36 passes into the center hole (not designated) of the rotary cutter 35, so that its inner face 38 is flush with the inner face of the housing wall 17. We now take the journal pin, which is a specially shaped and constructed journal pin disclosed in Figures 3, 4, and 5.

In the same way that we introduced the journal pin of Figure 14, we now introduce the master key. Its shank 36 passes thru the hole 30 in bearing arm 17a, spans the space or slot 24, and enters the slot or hole 19a of the housing wall 11a. The hole 30 may be formed with an annular flange-receiving counterseat 44, which is perforated by the rod-receiving notch 46 (Fig. 6) in its lower plane, which notch communicates with the hole or bore 47 that extends clear thru the bearing arm 17a for the width thereof. The master key has its flange 41 fitted snugly into the counterseat 44 in the hole 30 in such a manner that the kerf 42 of the master key cut upon the shank 36 thereof will register with the hole 47 accurately to allow a locking rod 45 to be inserted into the hole or bore 47 and pressed home thereinto, so this rod enters notch 46 of the hole 30, and extends into the kerf 42 of the master key for the purpose of preventing the accidental displacement of the master key. Both journal pins, including the master key incline upwardly towards the shaft 22. The holes 19a, 30, and 19, 30 are arranged one higher than the other respectively, the holes 30 being lowermost.

The hole 21 and the hole 30 may intersect at the point 48 as shown in Figure 7. Hence the journal pin of Figure 14 has its shank formed with an arcuate recess 39 so one end of shaft 22 may project frictionally upon the journal pin; however, in Figure 7 the master key itself is shown formed with this arcuate recess 39, although either pin but not both pins will be so formed. When the set or binding screw 49 is tapped into the housing wall 11a, it holds the shaft 22 fast and against accidental displacement from the housing.

It will be seen thus that the shaft 22 contributes to lock the four journal pins indirectly; in removable position upon our tool head. It locks the bearing block 14 in position in the housing, since it passes thru the hole 15 thereof; the locking block 14, in turn wedges the journal pins 25, for the cutters 31, 32 in position; this shaft 22 also frictionally engages the recess 39 of the third journal pin or the master key, as the case may be, thus holding this pin in position against displacement, and the shaft 22 also registers the master key so its kerf 42 registers with hole 47, in arm 17a. The master key, being rigidly locked by the rod 45, helps to secure the shaft 22 in position, as does set screw 49. We do not restrict ourselves to the exact details of construction save as pointed out in the appended claims.

What we desire to claim and secure by Letters Patent is:—

1. A drilling bit comprising a shank, a substantially rectangular boxing integrally formed on one end of the shank, a plurality of coaxial webs integrally formed with the shank, said webs being arranged in spaced relation to the sides of the boxing, a plurality of cutters rotatably mounted within the boxing, and cutters rotatably mounted between each of the webs and the outer wall of the boxing.

2. A drilling bit comprising a shank, a boxing integrally formed with the shank, a plurality of coaxial webs on the shank spaced outwardly from the outer boxing walls and parallel therewith, a plurality of cutters, a cutter shaft mounted in the boxing, said cutters being journaled on the shaft, a locking plate in the boxing, said shaft extending thru the locking plate whereby the plate is held in position, each of a pair of journal pins extending thru a boxing wall and into a web, said locking plate engaging the inner faces of the journal pins whereby the pins are held against removal, cutters mounted on said pins, each of a second pair of journal pins extending thru a boxing wall into a web, and cutters journaled on each of the last named journal pins.

3. A drilling bit comprising a shank, a rectangular housing integrally formed with the shank, two opposing walls of said housing having openings formed therein, a locking plate within the housing and removably anchored in the bottom thereof, a cutter shaft passing thru said openings and thru the locking plate, means engaging said shaft whereby it is held against displacement, a plurality of webs integrally formed with the shank, said webs being spaced from the sides of the housing, each of a pair of journal pins fitted at one end in a wall of the housing and at the other end in one of the webs, said journal pins being diametrically opposed, said locking plate engaging the inner end of each of the journal pins whereby they are held against inward displacement, a second pair of journal pins, each of said last named journal pins extending thru a wall of the housing and a web, said last named journal pins being in a plane at right angles to the plane of the first named journal pins, the last named journal pins being inclined inwardly and downwardly and entering into the walls of the housing adjacent the cutter shaft whereby the shaft engages the pins at an angle, and cutters journaled on each of the pins and on the shaft.

4. A drilling bit comprising a shank, a substantially rectangular housing integrally formed with the shank, a horizontal shaft extending thru the housing and mounted in opposite housing walls, a plurality of cutters journaled on the shaft, a web opposite each of the walls of the housing and spaced therefrom, said webs being integrally formed with the shank, and cutters journaled between each of the webs and said housing.

5. A drilling bit comprising a shank, a substantially rectangular housing integrally formed with the shank, a horizontal shaft extending thru the housing and mounted in opposite housing walls, a plurality of cutters journaled on the shaft, a web opposite each of the walls of the housing and spaced therefrom, said webs being integrally formed with the shank, cutters journaled between each of the webs and said housing, a locking plate in the housing, means removably securing the locking plate in position, said locking plate engaging the inner ends of diametrically opposed journal pins mounted at opposite ends in the housing wall and the web, respectively, whereby said journal pins are held against inward displacement.

ARTHUR W. JOHNS.
CHARLES O. THRASHER.
STUART R. EARL.
JOHN PECHACEK.